United States Patent Office 3,081,309
Patented Mar. 12, 1963

3,081,309
DERIVATIVES OF 4-(2-PROPYNYL)-4-PIPERIDINOL AND THEIR PROCESS OF PREPARATION
Maurice Prost, Brussels, Belgium, assignor, by mesne assignments, to Societe Belge de l'Azote et des Produits Chimiques du Marly, Liege, Belgium
No Drawing. Filed Sept. 14, 1960, Ser. No. 55,831
Claims priority, application Germany Sept. 19, 1959
12 Claims. (Cl. 260—293.4)

The invention relates to novel derivatives of piperidine and to a novel process for their preparation.

More specifically, the compounds of the invention are derivatives of 4-(2-propynyl)-4-piperidinol and are represented by the general formula:

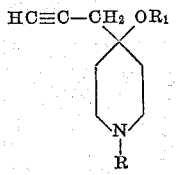

in which R is a member of the group consisting of straight-chain aliphatic monovalent hydrocarbon radicals containing 1 to 4 carbon atoms, alkoxyalkyl, phenoxyalkyl, cycloaliphatic, and straight and branched chain alkylaromatic radicals, and $R_1$ is an organic acid radical.

Salts of many of the substances covered by the above general formula have been found to have very valuable pharmacological properties. As shown by the pharmacological data given below, some of these substances exert a strong antitussive action, others are markedly analgesic, while still others possess a pronounced anesthetic action.

These pharmacological actions are unexpected when considered in the light of the observations of L. Berger, A. Ziering and J. Lee (J. Org. Chemistry, 1947, 12, p. 904). These authors found that the replacement of the phenyl group in 1-alkyl-4-phenyl-4-acyloxy-piperidines by an aliphatic hydrocarbon gave compounds of "practically no activity."

*Antitussive action.*—This action was measured on a slightly anesthetized cat in accordance with the method of Domenjoz (R. Domenjoz, Arch. Exp. Path. Pharmak., 1952, 215, 19) which consists in stimulating electrically every 3 minutes the central end of the severed superior laryngeal nerve and registering on a kymograph the attacks of coughing thus produced. The degree of activity observed is expressed in terms of the activity of codeine. With the exception of codeine, all the substances listed hereunder were investigated in the form of the hydrochloride.

| Substance | | Activity, codeine equals 1 |
|---|---|---|
| R | $R_1$ | |
| —CH₃ | COCH₂CH₃ | 1 |
| —CH₃ | —CO—⟨⟩ | 1 |
| —CH₃ | —COCH₂O—⟨⟩ | 1.5 |
| —CH₃ | —COCH₂CH₂—⟨⟩ | 1 |
| —CH₃ | —CO—⟨OCH₃, OCH₃, OCH₃⟩ | 1 |
| —⟨H⟩ | —CONH₂ | 1 |
| —CH₂CH₂—⟨⟩ | —COCH₃ | 1.5 |
| —CH₂CH₂—⟨⟩ | —COCH₂CH₂—⟨⟩ | 1 |
| —CH(CH₃)CH₂—⟨⟩ | —COCH₂CH₃ | 2 |
| —CH₂CH₂—⟨⟩ | —COCH₂CH₃ | 3 |

The following salts of this last substance have given the results indicated below:

Hydrochloride _____ 3
Hydrogen fumarate _____ 2.5
Citrate _____ 2
Oxalate _____ 2.25
Tartrate _____ 2.5
Hydrogen sulfate _____ 2.5
Hydrobromide _____ 2.5
Nitrate _____ 2.5
Guaiacolsulfonate _____ 1
β-Naphthalenesulfonate _____ 3
d-Camphosulfonate _____ 3
Hydrogen phthalate _____ 2.5
Methanesulfonate _____ 2.5
Hippurate _____ 2.5

*Analgesic action.*—The analgesic action was studied on the mouse by means of the technique described by Haffner (F. Haffner, Dtsch. Med. Wschr., 1929, 55, 731) which consists in provoking pain by pinching the base of the mouse's tail with a strong artery-clip. The results of this investigation are expressed as the percentage of animals rendered insensible to pain by a dose of 50 mg./kg. of body-weight.

| Substance | | Percentage of animals insensible to pain after 50 mg./kg. |
|---|---|---|
| R | $R_1$ | |
| —CH₃ | —COCH₂CH₃ | 50 |
| —CH₃ | —COC(CH₃)₃ | 60 |
| —CH₃ | —CO—⟨⟩ | 50 |
| —C₂H₅ | —COCH₂CH₃ | 50 |
| —C₄H₉-n | —COCH₂CH₃ | 40 |
| —CH₂CH₂CH₂OCH₃ | —COCH₂CH₃ | 50 |

| Substance | | Percentage of animals insensible to pain after 50 mg./kg. |
|---|---|---|
| R | $R_1$ | |
| $-CH(CH_3)CH_2-\langle\rangle$ | $-COCH_2CH_3$ | 80 |
| $-CH(CH_3)CH_2-\langle\rangle$ | $-CONH_2$ | 40 |
| $-CH_2-CH_2-O-\langle\rangle$ | $-CONH_2$ | 50 |

*Local anesthetic action.*—The surface anesthetic action was studied by the classical method which consists in touching the cornea of the guinea-pig with a horse-hair mounted on a glass-rod. The cornea is touched 10 times within the space of 30 seconds, every 5 minutes, and note is taken of the number of positive reactions (absence of blinking) until the anesthetic effect disappears. Results are expressed in terms of the activity of procaine.

| Substance | | Activity, procaine equals 1 |
|---|---|---|
| R | $R_1$ | |
| $-CH_2-\langle\rangle$ | $-COCH_2CH_3$ | 1 |
| $-CH_2CH_2-\langle\rangle$ | $-CONH_2$ | 1 |
| $-CH_2CH_2-\langle\rangle$ | $-COCH_2CH_3$ | 7 |
| $-CH_2CH_2-\langle\rangle$ | $-COCH_2CH_2CH_3$ | 4.5 |
| $-CH_2CH_2-\langle\rangle$ | $-COCH=CH-CH_3$ | 1 |
| $-CH_2CH_2-\langle\rangle$ | $-COCH_2O-\langle\rangle$ | 5 |
| $-CH(CH_3)-CH_2-\langle\rangle$ | $-COCH_2CH_3$ | 5 |

The method of preparation according to the invention is characterized by the use of organo-metallic processes for obtaining 4-(2-propynyl)-4-piperidinols and the corresponding esters.

There are three types of organo-metallic processes, i.e., the organo-magnesium method of Grignard; the organo-zinc method of Reformatzky; the organo-aluminum method described by Prevost et al. (Ch. Prevost and M. Gaudemar, C. R. Hebd. Seances Acad. Sc., 1954, 239, 282).

However, the organo-magnesium method of Grignard, although valid for the preparation of the new compounds covered by the above general formula, is not the most advantageous, firstly because the operations involved are more delicate and, secondly, because of the formation of undesirable by-products.

With regard to the use of the zinc process of Reformatzky, this reaction, although also valid for preparing the above-described new compounds, nevertheless presents the disadvantageous of low yield and formation of by-products.

These difficulties have been finally overcome by the use of an aluminum amalgam as organo-metallic reaction agent which enables the reaction to be performed with the maximum yield and facility. It should be added, in this connection, that this new process which is part of the claimed invention constitutes the first application of this organo-aluminum reaction to basic ketones.

According to the claimed invention, an amalgam is prepared from turnings, granules or foils of magnesium, zinc or aluminum, to which is added 2-propynyl halide in the presence of an ether. When the organo-metallic complex is formed, an N-substituted piperidone is added. The metallic compound is then decomposed by aqueous hydrolysis to give the carbinol which is subsequently isolated and esterified by known methods. The basic ester is then reacted with an organic or inorganic acid to form the corresponding salt.

According to a variation of this organo-metallic process, the product formed after the N-substituted piperidone is added is converted directly to an ester by reaction with the anhydride of an organic acid, the resultant basic ester being then reacted with an organic or inorganic acid to form the corresponding salt. The invention described above may be illustrated by the following non-limitative examples:

EXAMPLE I

*Salts of N-Phenethyl-4-(2-Propynyl)-4-Propionoxy-Piperidine. (Organo-Magnesium Method)*

The (2-propynyl)-magnesium bromide is prepared by stirring, at about −10 to 0° C., 4.54 g. (0.186 mole) of amalgamated magnesium in 12.5 ml. of dry ether with a solution of 22.35 g.=14.7 ml. (0.189 mole) of (2-propynyl)-bromide in 50 ml. of dry ether. The reaction lasts two hours. To the resultant product, 30.45 g. (0.15 mole) of N-phenethyl-4-piperidone dissolved in 45 ml. of dry ether are added at about 0° C. An abundant and very viscous precipitate forms. The mixture is maintained first for two hours, at about 0° C., and then, for one hour, at normal temperature. It is then cooled to about 0° C. and a solution of 45.3 g. (0.225 mole) of propionic anhydride in 100 ml. of dry benzene is added. The reaction mixture is stirred until it returns to ordinary temperature after which it is heated for 8 hours at 60° C. on a water-bath. The mixture is decomposed with iced water, alcalinized with sodium hydroxide and saturated with salt. The ester is then extracted with benzene and the benzene solution washed with salt-saturated water. The solution is dried over anhydrous sodium sulfate, the solvent eliminated and the residue distilled under high vacuum. In this way 20.2 g. of N-phenethyl-4-(2-propynyl)-4-propionoxy-piperidine are obtained. B.P.: 140–150° C./0.2 mm.

The hydrogen fumarate is prepared by adding the base (0.5 mole) to a warm solution of 60.3 g. (0.52 mole) of fumaric acid dissolved in 600 ml. of isopropyl alcohol. The hydrogen fumarate crystallizes on cooling. The product is filtered out, washed with a very small quantity of cold isopropyl alcohol and dried. M.P.: 190–191° C.

$C_{23}H_{29}O_6N$: Calculated—N=3.39%; C=66.48%; H=7.03%. Found—N=3.37%; C=66.52%; H=7.05%.

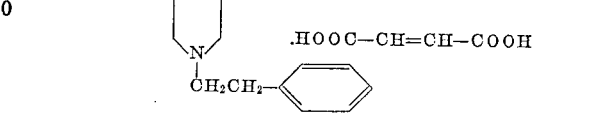

The following salts were prepared in a similar manner:

TABLE I

Salts of N-phenethyl-4-(s-propynyl)-4-propionoxy-piperidine

| Salt | Empirical formula | M.P., °C. | Prepared in— | Recrystallized in— | Centesimal analysis | | | |
|---|---|---|---|---|---|---|---|---|
| | | | | | Calc. | Found | Additional Calc. | Elements found |
| Hydrochloride | C₁₉H₂₆O₂NCl | 224±1 | Ether | Ethyl-acetate-methanol | 4.17 | 4.20 | C=67.34<br>H= 7.80 | 67.55<br>7.78 |
| Hydrobromide | C₁₉H₂₆O₂NBr | 244±1 | Acetone | do | 3.68 | 3.79 | Br=21.01 | 21.25 |
| Hydrogen sulfate | C₁₉H₂₇O₆NS | 112±2 | do | Ethyl-acetate-ether | 3.53 | 3.50 | S= 7.90 | 8.06 |
| Nitrate | C₁₉H₂₆O₅N₂ | 141–149 | do | do | 7.73 | 7.73 | | |
| Citrate | C₂₅H₃₃O₉N | 50–55 | Ether | | 2.84 | 2.78 | C=61.09<br>H= 6.76 | 61.01<br>6.83 |
| Oxalate | C₂₁H₂₇O₆N | 190–191 | do | Ethyl-acetate-methanol | 3.59 | 3.56 | C=64.79<br>H= 7.05 | 64.90<br>6.90 |
| Tartrate H₂O | C₂₃H₃₁O₈N·H₂O | 55–60 | Ethanol | Acetone-ether | 3.13 | 3.03 | C=59.08<br>H= 7.11 | 59.39<br>6.94 |
| Methanesulfonate | C₂₀H₂₉O₅NS | 169±1 | Acetone | Acetone | 3.54 | 3.51 | S= 8.10 | 8.37 |
| Hippurate | C₂₈H₃₄O₅N₂ | 109±0.5 | do | Ethyl-acetate | 5.85 | 5.80 | | |
| Guaiacolsulfonate | C₂₆H₃₃O₇NS | 143±2 | do | Acetone | 2.78 | 2.92 | S= 6.36 | 6.45 |
| α-Naphthalenesulfonate | C₂₉H₃₃O₅NS | 175 | do | Ethyl-acetate-acetone | 2.75 | 2.83 | S= 6.31 | 6.52 |
| β-Naphthalenesulfonate | C₂₉H₃₃O₅NS | 208–209 | do | Acetone | 2.75 | 2.65 | S= 6.31 | 6.28 |
| d-Camphosulfonate | C₂₉H₄₁O₆NS | 144–145 | do | Ethyl-acetate | 2.63 | 2.40 | S= 6.03 | 6.10 |
| Hydrogen phthalate | C₂₇H₃₁O₆N | 107–109 | Ether | do | 3.00 | 2.94 | | |

EXAMPLE II

*Hydrogen Fumarate of N-Phenethyl-4-(2-Propynyl)-4-Propionoxypiperidine. (Organo-Zinc Method)*

The bromide of (2-propynyl) zinc is prepared by mixing and stirring, at a temperature between 35 and 45° C., 12.25 g. (0.186 mole) of amalgamated zinc in 15 ml. of anhydrous tetrahydrofuran and 22.35 g.=14.7 ml. (0.187 mole) of (2-propynyl) bromide in 40 ml. of anhydrous tetrahydrofuran. The reaction lasts 3 hours. The reaction mixture is allowed to stand overnight at room temperature. It is then cooled to about 0° C. and a solution added comprising 30.45 g. (0.15 mole) of N-phenethyl-4-piperidone- in 45 ml. of benzene. The operation of adding this solution lasts 3 hours. The mixture is then stirred for several hours until it returns to normal temperature. While still at normal temperature, 45.3 g. (0.225 mole) of propionic anhydride dissolved in 100 ml. of anhydrous benzene are added. The reaction mixture is heated for 3 hours at 50° C., and then allowed to stand for 2 days at normal temperature. The operations of separating out the end-products are the same as those described in Example I. In this way, 8.0 g. of N-phenethyl-4-(2-propynyl)-4-propionoxy-piperidine are obtained. B.P.: 132–138° C./0.08 mm.

From this base the hydrogen fumarate is obtained which is identical to that of Example I.

EXAMPLE III

*Hydrogen Fumarate of N-Phenethyl-4-(2-Propynyl)-4-Propionoxypiperidine. (Organo-Aluminum Method)*

To a suspension of 18.4 g. (0.68 mole) of aluminum in 100 ml. of anhydrous tetrahydrofuran and 60 ml. of anhydrous benzene are added 50 mg. of mercuric chloride. Amalgamation is completed by stirring for one hour. To this suspension of aluminum amalgam are added, drop by drop, 83 ml. (1.06 mole) of (2-propynyl) bromide in 140 ml. of anhydrous benzene. The temperature of the reaction mixture is maintained between 25 and 30° C. by suitable cooling. When all the bromide is added, the solution is heated to 35° C. for one hour. It is then cooled to about 20–25° C. and while it is maintained at this temperature a solution of 203 g. (1 mole) of N-phenethyl-4-piperidone in 600 ml. of anhydrous benzene is slowly added. To terminate the reaction, the reaction mixture is stirred for 8 to 12 hours at normal temperature. At the end of this period, 260 g. (2 moles) of propionic anhydride dissolved in 500 ml. of anhydrous benzene are added. The temperature of the reaction mixture, which is 20° C. when the operation of introducing the propionic anhydride commences, rises gradually to about 40° C. It is then brought up to 55–60° C. and maintained at this level for 5 to 6 hours. The residue formed when the piperidone is added dissolves gradually. The reaction mixture, while still warm, is poured into 1.5 l. of iced water. The hydrolysis solution is completed by stirring over a period of 12 hours.

While the reaction mixture is being cooled, it is alcalinized by means of a 50% solution of sodium hydroxide after which the ester is extracted several times with benzene. The benzene extracts are washed with salt water and then dried over sodium sulfate. The solution is filtered and the solvent eliminated. The residue is distilled under high vacuum. In this way, 142.0 g. of crude N-phenethyl-4-(2-propynyl)-4-propionoxy-piperidine are obtained. B.P.: 140–150° C./0.2 mm.

From this base the hydrogen fumarate is prepared which is identical to that of Example I.

EXAMPLE IV

*Hydrochloride of N-Aralkyl (N-Phenoxyalkyl and N-Cyclohexyl)-4-(2-Propynyl)-4-Piperidinol Esters*

The aluminum amalgam is prepared from 10.8 g. (0.4 mole) of aluminum, 21 ml. of anhydrous tetrahydrofuran, 50 ml. of anhydrous toluene and 50 mg. of mercuric chloride. Under identical conditions to those described in Example III, 3.47 g. (0.6 mole) of (2-propynyl) bromide dissolved in 85 ml. of toluene are added. When the formation of the complex is completed, 43.6 g. (0.2 mole) of N-(phenyl-2-propyl)-4-piperidone- are introduced. After a reaction period of 3 to 4 hours, the reaction mixture is poured into iced water acidified by means of 25 ml. of acetic acid. The mixture is stirred for about 10 hours after which a 40% aqueous solution of sodium hydroxide is added until the solution is alcaline and the aluminum is completely dissolved. The carbinol is extracted with benzene and the benzene layers washed with salt water, dried over anhydrous sodium sulfate, filtered and the solvent eliminated. The residue is distilled under high vacuum. In this way, 26.2 g. of N-(phenyl-2-propyl)-4-(2-propynyl)-4-piperidinol are obtained. B.P.: 120–125° C./0.02 mm.

The carbinol was characterized by preparing its hydrochloride in anhydrous ether. M.P.: 179–180° C. (from ethyl acetate-methanol).

$C_{17}H_{24}ONCl$: Calculated.—N=4.76%; Cl=12.06%. Found.—N=4.64%; Cl=12.10%.

To esterify the carbinol, 7.71 g. (0.03 mole) of the carbinol obtained above, 5.19 ml. of propionyl chloride and 9.51 ml. of diethylaniline dissolved in 50 ml. of toluene are heated, while being stirred, over a water-bath. The mixture is heated for 18 hours at 90–95° C. After cooling, 25 ml. of water are added and the reaction mixture alcalinized with about 0.15 mol of sodium bicarbonate, after which the ester is extracted with ether. The ethereal extracts are washed with salt water and then treated over anhydrous sodium sulfate. The solution is filtered and first the solvent and then the diethylaniline are eliminated. The residue is distilled under high vacuum. In this way, 7.0 g. of N-(phenyl-2-propyl)-4-(2-propynyl)-4-propionoxy-piperidine are obtained. B.P.: 140–150° C./0.25 mm.

The hydrochloride is prepared in anhydrous ether by introducing hydrochloric acid gas. The reaction product recrystallizes in acetone. M.P.: 180–188° C. (decomposition).

$C_{20}H_{28}O_2NCl$: Calculated.—N=4.00%; Cl=10.13%. Found: N=3.99%; Cl=10.30%.

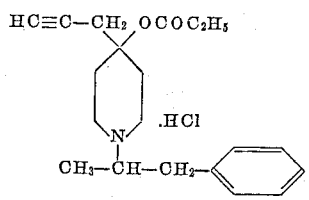

As a variation to the above, esterification may be performed by heating the base with a reflux condenser for 5 to 8 hours with an excess of an organic acid anhydride in the presence of a trace of concentrated sulfuric acid.

The carbinols (Table II) and corresponding esters (Table III) were prepared in a similar manner.

TABLE II
*N-aralkyl, N-phenoxyalkyl and N-cyclohexyl-(2-propynyl)-piperidinols*

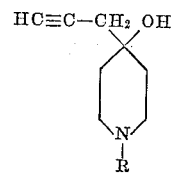

| R | Empirical formula | Bases | | Hydrochlorides | | | | |
| | | B.P. ° C./mm. | Analysis, N | | M.P., ° C. | Centesimal analysis | | | |
| | | | | | | N | | Cl | |
| | | | Calc. | Found | | Calc. | Found | Calc. | Found |
|---|---|---|---|---|---|---|---|---|---|
| —CH$_2$—C$_6$H$_5$ | $C_{15}H_{19}ON$ | 140–145/0.1 | 6.11 | 6.32 | 183 | 5.27 | 5.27 | 13.33 | 13.39 |
| —CH$_2$CH$_2$—C$_6$H$_5$ | $C_{16}H_{21}ON$ | 143–147/0.1 | 5.75 | 5.95 | 130 | 5.00 | 5.03 | 12.67 | 12.78 |
| —C$_6$H$_{11}$ | $C_{14}H_{23}ON$ | 118–125/0.3 [1] | 6.31 | 6.41 | 206±1 | 5.43 | 5.61 | 13.75 | 13.80 |
| —CH$_2$—CH$_2$—O—C$_6$H$_5$ | $C_{16}H_{21}O_2N$ | 160°/0.3 [2] | 5.40 | 5.65 | 137±1 | 4.73 | 4.86 | 11.98 | 12.16 |

[1] M.P. 94±1° (from petroleum ether 30/40).
[2] M.P. 64–65° C. from petroleum ether B.P. 30 to 40° C.

TABLE III
*Esters of N-aralkyl, N-phenoxyalkyl and N-cyclohexyl-(2-propynyl)-piperidinols*

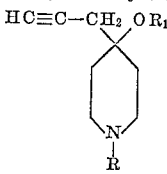

| R | R$_1$ | Empirical formula | Bases, B.P., ° C./mm. | Hydrochlorides | | | | |
| | | | | M.P., ° C. | Centesimal analysis | | | |
| | | | | | N | | Cl | |
| | | | | | Calc. | Found | Calc. | Found |
|---|---|---|---|---|---|---|---|---|
| —CH$_2$—C$_6$H$_5$ | —COC$_2$H$_5$ | $C_{18}H_{23}O_2N$ | 147–150/0.3 | 165 | 4.35 | 4.37 | 11.01 | 11.10 |
| —C$_6$H$_{11}$ | —COC$_2$H$_5$ | $C_{17}H_{27}O_2N$ | 125–130/0.15 | [1] 220–230 | 4.46 | 4.55 | 11.29 | 11.42 |
| —CH$_2$CH$_2$—C$_6$H$_5$ | —COCH$_3$ | $C_{18}H_{23}O_2N$ | 151–154/0.35 | 265 | 4.35 | 4.33 | 11.01 | 11.07 |

TABLE III—Continued

*Esters of N-aralkyl, N-pheno)yalkyl and N-cyclohe)yl-(2-propynyl)-piperidinols*

| R | R₁ | Empirical formula | Bases, B.P., °C./mm. | Hydrochlorides | | | | |
|---|---|---|---|---|---|---|---|---|
| | | | | M.P., °C. | Centesimal analysis | | | |
| | | | | | N | | Cl | |
| | | | | | Calc. | Found | Calc. | Found |
| —CH₂CH₂—⌬ | —COCH₂CH₂CH₃ | C₂₀H₂₇O₂N | 163–166/0.5 | 186–187 | 4.00 | 4.02 | 10.10 | 10.14 |
| —CH₂CH₂—⌬ | —COCH=CH—CH₃ | C₂₀H₂₅O₂N | 160–165/0.1 | 187 | 4.02 | 4.20 | 10.19 | 10.48 |
| —CH₂CH₂—⌬ | —CO—⌬ | C₂₃H₂₅O₂N | 175/0.05 | 180 | 3.64 | 3.59 | 9.23 | 9.54 |
| —CH₂CH₂—⌬ | —COCH₂CH₂—⌬ | C₂₅H₂₉O₂N | 175–185/0.09 | 181+1 | 3.40 | 3.47 | 8.60 | 8.67 |
| —CH₂CH₂—⌬ | —COCH₂O—⌬ | C₂₄H₂₇O₃N | -------------- | 188–189 | 3.38 | 3.39 | 8.56 | 8.60 |
| —CH₂—CH₂—O—⌬ | —COC₂H₅ | C₁₉H₂₅O₃N | 165–175/0.6 | 143±1 | 3.97 | 4.04 | 10.07 | 10.31 |

¹ Decomposed.

EXAMPLE V

*Salts of esters of N-alkyl (and N-methoxypropyl)-4-(2-propynyl)-4-piperidinols*

By the process described in Example III the aluminum amalgam is prepared by treating with 50 mg. of mercuric chloride a suspension of 10.1 g. (0.375 mole) of aluminum in 20 ml. of anhydrous tetrahydrofuran and 50 ml. of anhydrous toluene. Under the same conditions as those described in example III, 66.6 g.=44 ml. (0.56 mole) of (2-propynyl) bromide dissolved in 140 ml. anhydrous toluene are added, after which 71.2 g. (0.56 mole) of N-ethyl-piperidone-4 dissolved in 200 ml. of anhydrous toluene are also added. The following phases of the reaction as well as the conditions of separation are identical to those described in Example IV. In this way, 62 g. of N-ethyl-4-(2-propynyl)-4-piperidinol are obtained. B.P.: 105–110° C./10 mm.

$C_{10}H_{17}ON$: Calculated. — N=8.47%. Found: N=8.46%.

The carbinol was characterized by preparing the hydrochloride in anhydrous ether, M.P.: 119–120° C. (from ethyl acetatemethanol).

$C_{10}H_{18}ONCl$: Calculated. — N=6.87%; Cl=17.40%. Found.—N=6.93%; Cl=17.35%.

To esterify 8.35 (0.05 mole) of carbinol using 8.65 ml. of propionyl chloride in the presence of 12.65 ml. of dimethylaniline in 50 ml. of anhydrous toluene, the process is identical to that described in Example IV. The product is also separated in a similar manner and N-ethyl-4-(2-propynyl)-4-propionoxy-piperidine is obtained.

B.P. 131–133° C./12 mm.; hydrochloride, M.P. 172–173° C. (from ethyl acetate and methanol).

$C_{13}H_{22}O_2NCl$: Calculated. — N=5.39%; Cl=13.65%. Found:—N=5.38%; Cl=13.56%.

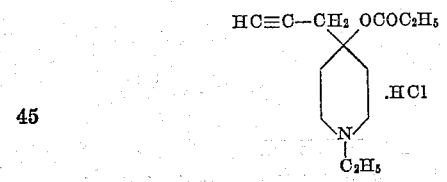

The carbinols and esters given in Tables IV and V were prepared in a similar manner.

TABLE IV

*N-alkyl and N-methoxypropyl-4-(2-propynyl)-piperidinols*

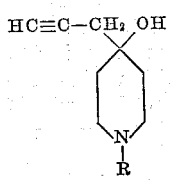

| R | Empirical formula | Bases | | | Salts | | | | |
|---|---|---|---|---|---|---|---|---|---|
| | | B.P., °C./mm. | M.P., °C. | Centesimal analysis, N | M.P., °C. | Centesimal analysis | | | |
| | | | | | | N | | Cl | |
| | | | | Calc. | Found | | Calc. | Found | Calc. | Found |
| —CH₃ | C₉H₁₅ON | 115–120/20 | 91±2 | 9.14 | 9.13 | 114–115 | 7.38 | ¹7.34 | 18.61 | 18.77 |
| —C₃H₇—n | C₁₁H₁₉ON | 107–114/10 | 59–60 | 7.72 | 7.73 | 139–140 | 6.43 | ¹6.54 | 16.51 | 16.35 |
| —C₄H₉—n | C₁₂H₂₁ON | 120–125/0.05 | -------- | -------- | -------- | 149±1 | 4.50 | ²4.70 | -------- | -------- |
| —CH₂CH₂CH₂OCH₃ | C₁₂H₂₁O₂N | 103–113/0.25 | -------- | -------- | -------- | 104–105 | 4.30 | ²4.35 | -------- | -------- |

¹ Hydrochloride.   ² Hydrogen fumarate.

TABLE V
Esters of N-alkyl and N-methoxypropyl-4-(2-propynyl)-4-piperidinols)

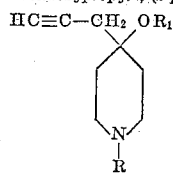

| R | R₁ | Empirical formula | Bases, B.P., °C./mm. | Hydrochlorides M.P., °C. | N Calc. | N Found | Cl Calc. | Cl Found |
|---|---|---|---|---|---|---|---|---|
| —CH₃ | —COCH₃ | C₁₁H₁₇O₂N | 120–121/14 | 184±1 | 6.04 | 6.03 | 15.30 | 15.27 |
| —CH₃ | —COC₂H₅ | C₁₂H₁₉O₂N | 125–130/14 | 222 | 5.70 | 5.75 | 14.42 | 14.59 |
| —CH₃ | —COC₃H₇-n | C₁₃H₂₁O₂N | 133–137/13 | 190–192 | 5.39 | 5.38 | 13.65 | 13.69 |
| —CH₃ | —COCH(C₂H₅)₂ | C₁₅H₂₅O₂N | 95–100/0.07 | 101±1 | 4.86 | 4.96 | 12.31 | 12.30 |
| —CH₃ | —COC(CH₃)₃ | C₁₄H₂₃O₂ | 130–132/15 | 180±1 | 5.11 | 5.15 | 12.94 | 13.07 |
| —CH₃ | —CO—⌬ | C₁₆H₁₉O₂ | 144–148/0.2 | 191±1 | 4.76 | 4.71 | 12.06 | 12.14 |
| —CH₃ | —COCH₂—⌬ | C₁₇H₂₁O₂N | 140–145/0.5 | 151±1 | 4.54 | 4.41 | 11.51 | 11.70 |
| —CH₃ | —COCH₂CH₂—⌬ | C₁₈H₂₃O₂N | 145–148/0.3 | 143–144 | 4.35 | 4.20 | 11.01 | 11.12 |
| —CH₃ | —COCH₂O—⌬ | C₁₇H₂₁O₃N | 150–154/0.25 | 178±1 | 4.32 | 4.24 | 10.94 | 10.8 |
| —CH₃ | —COC₆H₂(OCH₃)₃(3,4,5) | C₁₉H₂₅O₅N | ±180/0.3 | 219±1 | 3.64 | 3.67 | 9.23 | 9.34 |
| —C₃H₇-n | —COC₂H₅ | C₁₄H₂₃O₂N | 98–104/0.6 | 201±1 | 5.11 | 5.07 | 12.94 | 13.06 |
| —C₄H₉-n | —COC₂H₅ | C₁₅H₂₅O₂N | 150–155/13 | 205–206 | 4.86 | 4.89 | 12.31 | 12.35 |
| —CH₂CH₂CH₂OCH₃ | —COC₂H₅ | C₁₅H₂₅O₃N | 113/0.25 | 185±1 | 4.60 | 4.74 | 11.66 | 11.80 |

EXAMPLE VI

Carbamates of N-substituted-4-(2-propynyl)-4-piperidinols

A solution of 8.4 g. (0.04 mole) of N-cyclohexyl-4-(2-propynyl)-4-piperidinol (cf. Table III), in 32 ml. of pyridine is cooled to 0° C. and 11.2 ml. of phenylchloroformate added, drop by drop. The reaction mixture is maintained at about 0° C. for 3 hours and then at normal temperature for 24 hours. It is then poured into iced water and the reaction product extracted with a mixture of ether and benzene. The extracts are washed with water and dried over anhydrous sodium sulfate and the solvent eliminated.

To the residue, 100 ml. of methanol saturated with ammonia are added. The reaction mixture is allowed to stand for 20 hours at normal temperature, after which the methanol is evaporated under vacuum. The residue is taken up with ether and washed with water.

The ethereal solution is dried over anhydrous sodium sulfate, filtered and a part of the ether eliminated. Hydrochloric acid gas is passed through the ethereal solution obtained after concentration and the hydrochloride of N-cyclohexyl-4-(2-propynyl)-4-carbaminoyl-piperidine precipitates. M.P.: 245–250° C. (decomposition) (from ethyl acetate-methanol).

C₁₅H₂₅O₂N₂Cl: Calculated.—N=9.30%; Cl=11.78%.
Found.—N=9.34%; Cl=11.90%.

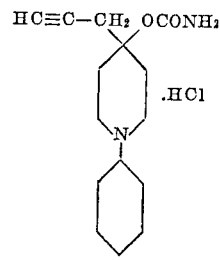

As a variation of the above, the carbamate has been separated, in certain cases, in the form of a crystallized base by precipitating with petroleum ether after elimination of the ether.

The carbamates listed in Table VI were prepared in a similar manner.

TABLE VI

Carbamates of N-substituted-4-(2-propynyl)-4-piperidinols

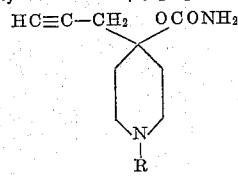

| R | Empirical formula | Bases | | Hydrochlorides | | | | |
|---|---|---|---|---|---|---|---|---|
| | | M.P., °C. | Centesimal analysis, N | M.P., °C. | Centesimal analysis | | | |
| | | | | | N | | Cl | |
| | | | Calc. | Found | | Calc. | Found | Calc. | Found |
| —CH$_2$CH$_2$—⟨⟩ | C$_{17}$H$_{22}$O$_2$N$_2$ | 145 | 9.78 | 9.82 | [1] 245±2 | 8.67 | 8.61 | 10.98 | 11.07 |
| —CH(CH$_3$)—CH$_2$—⟨⟩ | C$_{18}$H$_{24}$O$_2$N$_2$ | | | | 215–225 | 8.31 | 8.39 | 10.52 | 10.62 |
| —CH$_3$ | C$_{10}$H$_{16}$O$_2$N$_2$ | 187 | 14.27 | 14.30 | 226 | 12.03 | 11.81 | 15.23 | 15.14 |
| —C$_2$H$_5$ | C$_{11}$H$_{18}$O$_2$N$_2$ | 194–195 | 13.33 | 13.32 | 205–206 | 11.35 | 11.30 | 14.36 | 14.40 |
| —C$_3$H$_7$—n | C$_{12}$H$_{20}$O$_2$N$_2$ | 125–126 | 12.48 | 12.30 | 226–227 | 10.74 | 10.70 | 13.59 | 13.90 |
| —C$_4$H$_9$—n | C$_{13}$H$_{22}$O$_2$N$_2$ | | | | [1] 207–217 | 10.19 | 10.15 | 12.90 | 13.08 |
| —CH$_2$CH$_2$CH$_2$OCH$_3$ | C$_{13}$H$_{22}$O$_3$N$_2$ | | | | [1] 182±2 | 9.62 | 9.60 | 12.19 | 12.25 |
| —CH$_2$—CH$_2$—O—⟨⟩ | C$_{17}$H$_{22}$N$_2$O$_3$ | | | | 189±1 | 8.29 | 8.42 | 10.46 | 10.77 |

[1] Decomposed.

EXAMPLE VII

*Hydrochloride of the phenylcarbamate of N-methyl-4-(2-propynyl)-4-piperidinol*

To a solution of 0.3 g. of zinc acetate and 7.65 g. (0.05 mole) of N-methyl-4-(2-propynyl)-4-piperidinol (cf. Table IV) in 15 ml. of chloroform are added 6.0 g. (0.05 mole) of phenyl isocyanate. The reaction mixture is allowed to stand for 5 days at normal temperature after which it is refluxed for 4 hours. The last traces of isocyanate are then eliminated under vacuum, the residue taken up with chloroform and water and the chloroformic extract washed with water. After drying, this solvent is removed under vacuum and petroleum ether 30/40 added to the residue. The phenylcarbamate of N-methyl-4-(2-propynyl)-4-piperidinol crystallizes. M.P.: 126±2° C. (from benzene).

C$_{16}$H$_{20}$O$_2$N$_2$: Calculated.—10.28%. Found.—9.84%.
The hydrochloride is prepared by the classical method in ether, M.P.:229±1° C. (from ethyl acetate-methanol).
C$_{16}$H$_{21}$O$_2$N$_2$Cl: Calculated.—N=9.07%; Cl=11.48%. Found.—N=9.13%; Cl=11.41%.

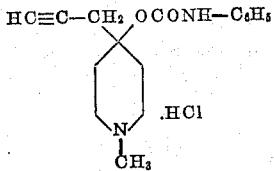

EXAMPLE VIII

*Hydrogen fumarate of N-phenethyl-4-(2-propynyl)-4-propionoxy-piperidine*

To a suspension of 4.0 g. (0.148 mole) of aluminum in 20 ml. of anhydrous tetrahydrofuran are added 50 mg. of mercuric chloride. The amalgamation is terminated by stirring for 1 hour. To this aluminum amalgam suspension are added 2 ml. of (2-propynyl) bromide. When the complex begins to form, 50 ml. of diethylene-glycol-diethylether are introduced and then 14.8 ml. (total 16.8 ml.=0.22 mole) of (2-propynyl) bromide dissolved in 50 ml. of diethyleneglycol-diethylether are added, drop by drop, at a temperature of 20 to 27° C. When the bromide has all been added the reaction mixture is allowed to stand 3 to 4 hours at normal temperature. A solution of 40.6 g. (0.2 mole) of N-phenethyl-4-piperidone dissolved in 100 ml. of diethyleneglycol-diethylether is then added at a temperature of 20 to 27° C. A yellowish precipitate is seen to form. To terminate the reaction, the mixture is stirred for 8 to 12 hours at normal temperature, after which 250 ml. of anhydrous benzene are added, the reaction mixture is cooled to about 5° C. and while this operation is maintained 41.6 ml. of propionic anhydride are introduced. The reaction mixture is allowed to stand until it returns to normal temperature, after which it is heated for 12 to 14 hours at 40–45° C. The operations of separation are identical to those described in Example III. Thus, 37.2 g. of crude N-phenethyl-4-(2-propynyl)-4-propionoxy-piperidine are obtained (B.P.: 135–145° C./0.07 mm.). After separation of the reaction product, 75% to 80% of the diethyleneglycol-diethylether may be recuperated.

From this base, the hydrogen fumarate is prepared which is identical to the product obtained in Example I. Instead of diethyleneglycol-diethylether, diethyleneglycol-dimethyl- or dibutylether, triethyleneglycol-diethylether or ethyleneglycol-diethyl- or dimethylether may be employed.

What is claimed is:
1. A compound of the class consisting of a free base and the pharmaceutically acceptable acid addition salts thereof, the free base represented by the formula:

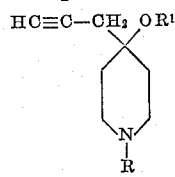

in which R is a radical selected from the group consisting of methyl, ethyl, propyl, butyl, 3-methoxypropyl, phenoxyethyl, cyclohexyl, benzyl, phenethyl and α-methyl phenethyl and $R_1$ is a radical selected from the group consisting of acetyl, propionyl, butyryl, diethyl acetyl, trimethylacetyl, crotonyl, benzoyl, trimethoxybenzoyl, phenylacetyl, β-phenylpropionyl, phenoxyacetyl and carbamyl.

2. N-phenethyl-4(2-propynyl)-4-propionoxy-piperidine.

3. The pharmaceutically acceptable non-toxic acid addition salts of N-phenethyl-4(2-propynyl)-4-propionoxy-piperidine.

4. N-(phenyl-2-propyl)-4-(2 - propynyl)-4-propionoxy-piperidine.

5. The pharmaceutically acceptable non-toxic acid addition salts of N-(phenyl-2-propyl)-4-(2-propynyl)-4-propionoxy-piperidine.

6. N-phenethyl-4-(2-propynyl)-4-acetoxy-piperidine.

7. The pharmaceutically acceptable non-toxic acid addition salts of N-phenethyl-4-(2-propynyl)-4-acetoxy-piperidine.

8. N-methyl-4-(2 - propynyl)-4-phenoxyacetoxy-piperidine.

9. The pharmaceutically acceptable non-toxic acid addition salts of N-methyl-4-(2-propynyl)-4-phenoxyacetoxy-piperidine.

10. Process for the preparation of a compound represented by the formula:

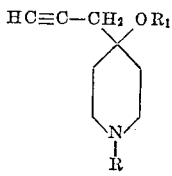

in which R is a radical selected from the group consisting of methyl, ethyl, propyl, butyl, 3-methoxypropyl, phenoxyethyl, cyclohexyl, benzyl, phenethyl and α-methyl phenethyl and $R_1$ is a radical selected from the group consisting of acetyl, propionyl, butyryl, diethyl acetyl, trimethylacetyl, crotonyl, benzoyl, trimethoxybenzoyl, phenylacetyl, β-phenylpropionyl, phenoxyacetyl and carbamyl, wherein a (2-propynyl) halide is reacted in the presence of an ether with a compound selected from the group consisting of magnesium, aluminum and zinc, the resultant organo-metallic complex reacted with an N-substituted piperidone and the metallo-halide derivative of propynyl-piperidinol obtained is decomposed by an organic acid anhydride to form the basic ester.

11. Process according to claim 10, wherein the (2-propynyl) halide is (2-propynyl) bromide.

12. Process according to claim 10, wherein the metallo-halide derivative of propynyl-piperidinol is decomposed by aqueous hydrolysis and the isolated propynyl-piperidinol subsequently reacted with an acylating agent selected from the group comprising organic acid halides and organic acid anhydrides to form the basic ester.

References Cited in the file of this patent

UNITED STATES PATENTS

| | | |
|---|---|---|
| 2,739,968 | Sperber et al. | Mar. 27, 1956 |
| 2,838,518 | Schuler | June 10, 1958 |
| 2,880,211 | Elpern | Mar. 31, 1959 |

OTHER REFERENCES

Nazarov et al.: Chemical Abstracts, vol. 52, page 17258 (1958).